United States Patent [19]

Mishra

[11] 4,265,798

[45] May 5, 1981

[54] ISOCYANURATE PRODUCTS AND POLYURETHANES THEREFROM

[75] Inventor: Anupama Mishra, Guelph, Canada

[73] Assignee: Uniroyal Ltd., Ontario, Canada

[21] Appl. No.: 120,027

[22] Filed: Feb. 11, 1980

[30] Foreign Application Priority Data

Jan. 28, 1980 [CA] Canada .................................. 344509

[51] Int. Cl.³ ............................................. C08L 75/04
[52] U.S. Cl. ............................ 260/32.4; 260/32.6 N; 427/385.5; 428/423.1; 528/50; 528/52; 544/193
[58] Field of Search ......................... 260/32.4, 32.6 N; 528/50, 52; 544/193; 427/385 R, 385.5; 428/425, 423.1

[56] References Cited

U.S. PATENT DOCUMENTS

| | | | |
|---|---|---|---|
| 2,801,244 | 7/1957 | Balou | 260/248 |
| 2,965,584 | 12/1960 | Elkin | 528/52 |
| 2,993,870 | 7/1961 | Burkus | 521/129 |
| 3,144,452 | 8/1964 | Wild et al. | 544/193 |
| 3,252,942 | 5/1966 | France et al. | 544/193 |
| 3,726,827 | 4/1973 | Jones et al. | 260/31.8 N |
| 4,000,104 | 12/1976 | Olstowski | 260/30.6 R |
| 4,000,105 | 12/1976 | Olstowski | 260/31.6 |
| 4,145,544 | 3/1979 | Kuehn | 544/193 |

OTHER PUBLICATIONS

Irwin, *Chem. Abst.*, vol. 77, 1972, p. 19, 75736t.
Herbstman, *J. Org. Chem.*, 30, 1965, pp. 1259–1260.
Beitchman, *Rubber Age*, Feb. 1966, pp. 65–72.
Reymore et al., *J. Cellular Plastics*, Nov./Dec. 1975, pp. 328–344.

*Primary Examiner*—Maurice J. Welsh
*Attorney, Agent, or Firm*—James J. Long

[57] ABSTRACT

Potassium salt of 2-pyrrolidinone is used as a catalyst to cyclotrimerize an organic diisocyanate, yielding a mixture of monomeric cyclotrimerized product (isocyanurate) and oligomers thereof, soluble in common organic solvents and vinyl monomers. The catalyst can be used to make one-shot isocyanurate-crosslinked polyurethanes. Prepolymers and moisture-curing coating compositions can also be prepared.

24 Claims, No Drawings

ISOCYANURATE PRODUCTS AND POLYURETHANES THEREFROM

This invention relates to a method of cyclotrimerizing an organic diisocyanate to form an isocyanurate product, and to the isocyanurate product thus formed. The invention also relates to isocyanurate-containing polyurethanes and methods of making same.

In one aspect the invention is directed to the use of the potassium salt of 2-pyrrolidinone as a catalyst for cycltrimerizing an organic diisocyanate, to form a product containing a mixture of monomeric and oligomeric isocyanurates.

In another aspect the invention relates to the use of the potassium salt of 2-pyrrolidinone as a catalyst for making an isocyanurate-crosslinked polyurethane from a diol and an organic diisocyanate, especially a non-cellular polyurethane.

The invention is also concerned with a solution of cyclotrimerized organic diisocyanate in a liquid vinyl monomer, and to a thermoset polymer made by treating such solution with a diol, a peroxide catalyst and an amine or tin catalyst.

The invention is further concerned with making a urethane prepolymer by reacting a diol with the described cyclotrimerized organic diisocyanate product, and with the preparation of cured polyurethane elastomer by reaction of such prepolymer with a polyurethane curative.

Additionally the invention involves coating compositions comprising cyclotrimerized organic diisocyanate, a diol, and a polyurethane catalyst, dissolved in an inert organic solvent.

As indicated, the invention is directed to the use of the potassium salt of 2-pyrrolidinone as a catalyst to cyclotrimerize an organic diisocyanate. The organic diisocyanate employed may be any organic diisocyanate of the kind usually employed in the manufacture of polyurethanes and may be aromatic, aliphatic or cycloaliphatic. Examples are toluene diisocyanate, methylene diphenylisocyanate and isophorone diisocyanate. Only a small, catalytic amount of the potassium salt of 2-pyrrolidinone is required, e.g., from about 0.001% or less to about 1% or more based on the weight of the diisocyanate. To carry out the reaction the organic diisocyanate and potassium salt of 2-pyrrolidinone are simply mixed together and allowed to react. It is frequently more convenient to dissolve the potassium salt of 2-pyrrolidinone in any suitable inert solvent or in excess 2-pyrrolidinone. Such solution may contain for example from about 3% or less to about 30% or more, by weight, of the potassium salt of 2-pyrrolidinone.

The catalyst employed in the present invention has many interesting features. Although the potassium salt of 2-pyrrolidinone has been utilized as a catalyst for the polymerization of 2-pyrrolidinone to nylon-4, it has not been used as an isocyanate trimerization catalyst, as far as the present inventor is aware. The typical procedure utilized in the preparation of this catalyst is quite simple: Solid potassium hydroxide is dissolved in 2-pyrrolidinone to form a 10% by weight solution which is heated at 100° C. for 3 to 4 hours (until homogeneous). This catalyst is quite active as will appear from the data below.

The cyclotrimerization may be carried out in bulk or in the presence of an inert organic solvent. The reaction proceeds at ambient temperatures but is faster at elevated temperatures. Sometimes the reaction is exothermic in which case it may be desirable to cool the reaction mixture externally; in other cases it may be desirable to apply external heat. Depending upon the particular diisocyanate and the duration of the reaction, a reaction temperature within the range of from about 20° C. or less to about 150° C. or more is ordinarily suitable.

The cyclotrimerization reaction is best carried out under an inert atmosphere (e.g., nitrogen), whether at atmospheric pressure or superatmospheric pressure.

The catalyst can be neutralized by an acylating agent, thus quenching the cyclotrimerization reaction at any stage desired. The activities of the acylating agents follow the pattern, acetyl chloride > benzoyl chloride > allyl chloride > benzyl chloride > methyl iodide.

Usually the reaction is allowed to proceed until insoluble material begins to form, whereupon the reaction may be substantially stopped by cooling and/or addition of an acylating agent. Usually the reaction time ranges from about ½ hour or less to about 24 hours or more. It is desirable to agitate the reaction mixture especially in the initial stages.

The cyclotrimerized product is a mixture of isocyanurates, containing the trimer and low molecular weight oligomers of the trimer. The product is soluble in many common solvents such as tetrahydrofuran, ethyl acetate, chlorinated hydrocarbons (e.g., chloroform, chlorobenzene), including the common vinyl monomers (e.g., styrene, acrylonitrile, alkyl acrylates, etc.).

In another aspect of the invention the potassium salt of 2-pyrrolidinone is used as a catalyst for the reaction of an organic diisocyanate with at least one diol to form an isocyanurate-cross-linked polyurethane. This reaction may be carried out under the conditions previously specified or under conditions conventionally used in making "one-shot" polyurethane articles. Any diol of the kind conventionally employed in making "one-shot" polyurethanes may be employed, including for example polyester glycols, polyether glycols, mixed polyester-ether glycols, poly(butadiene-co-acrylonitrile)diol, etc. Polymeric or high molecular weight diols (e.g., molecular weight of from about 200 or less to about 4000 or more) may be employed, or monomeric low molecular weight diols (e.g., 1,4-butanediol or cyclohexanedimethanol may be used. Mixtures of diols are frequently advantageous. The diisocyanate and diol may be employed in molar ratios conventionally used to make polyurethanes. Frequently the ratio of isocyanate groups to hydroxyl groups is from about 0.8:1 or less to about 2.5:1 or more. The final products consist of isocyanurate crosslinked polyurethanes having physical properties that render them useful for making shaped articles of all sorts. Particularly noteworthy are noncellular products prepared in this way, as distinguished from rigid foams based on isocyanurate structures.

Unexpectedly, the present catalyst has been found to promote the alcohol/isocyanate reaction at a rate faster than that of the isocyanate trimerization reaction. Thus, to demonstrate this, a mixture of toluene diisocyanate and a polypropylene glycol of molecular weight 425, in NCO:OH ratio of 2:1, may be allowed to react at 80° C. in the presence as well as in the absence of potassium salt of 2-pyrrolidinone catalyst. The loss of isocyanate absorption at 2250 $cm^{-1}$ and the appearance of urethane carbonyl absorption at 1720 to 1750 $cm^{-1}$, and of isocyanurate ring absorption at 1420 $cm^{-1}$, may be followed by infrared spectroscopy. The catalyst promotes urethane formation at a faster rate than the appearance of isocyanurate rings. The uncatalyzed reaction proceeds only slowly. The catalyzed material becomes non-tacky in 15–20 minutes whereas the uncatalyzed mixture is tacky even after 1.5 hours at 80° C. This behabior is especially useful in the preparation of "one-shot" polyurethane compositions, lightly cross-linked through isocyanurate units.

A particularly valuable form of the invention comprises a solution of the oligomeric cyclotrimerized organic diisocyanate composition in at least one liquid vinyl monomer, that is, a liquid ethylenically unsaturated (usually monoethylenically unsaturated) polymerizable monomer such as a vinyl aromatic compound, especially styrene, alpha-methylstyrene, methylstyrene, 2,4-dimethylstyrene, ethylstyrene, isopropylstyrene, butylstyrene, phenylstyrene, cyclohexylstyrene, benzylstyrene and the like, substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl 4-vinyl-benzoate, phenoxystyrene, p-vinyl diphenyl sulfide, p-vinylphenyl phenyl oxide, vinyl naphthalene and the like; the acrylic and substituted acrylic monomers such as acrylic acid, methacrylic acid, methyl acrylate, methyl methacrylate, cyclohexyl methacrylate, benzyl methacrylate, isopropyl methacrylate, octyl methacrylate, methacrylonitrile, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, alpha-chloroacrylonitrile, N,N-dimethylacrylamide, N,N-dibenzylacrylamide, N-butylacrylamide, methacrylyl formamide, and the like; vinyl ketones, such as vinyl methyl ketone, vinyl ethyl ketone, vinyl phenyl ketone, N-vinylpyrrolidone, vinyl imidazole, N-vinyl pyrrole, and the like; dimethylaminoethyl methacrylate, glycidyl acrylate, dichlorobutadiene, vinyl pyridine, and the like. Preferred materials are the vinyl aryl monomers (especially styrene and alpha-methyl styrene), the acrylic nitriles (especially acrylonitrle and methacrylonitrile), and the alkyl alkenoate esters (especially methyl and ethyl acrylate and methacrylate). Mixtures of vinyl aryl monomer with acrylic nitrile or alkyl alkenoate ester are especially preferred. The amount of such vinyl monomer in the composition may range from about 5% or less to about 95% or more, based on the combined weight of the vinyl monomer and oligomeric composition. If desired, the solution may be stabilized by the addition of small amounts of acylating agent and/or free radical polymerization inhibitor. The composition may be cured quite readily by reacting with a diol (for example a polymeric diol of the kind conventionally used for reaction with isocyanates to make polyurethanes) especially in the presence of a catalyst of the kind usually used to promote polyurethane-forming reaction between —NCO and —OH groups, such as a tertiary amine or tin catalyst, and a free radical polymerization catalyst such as a peroxide catalyst. Useful cast articles of all sorts may be prepared in this way from the described solution.

Thus, for example, the soluble nature of the oligomeric products in the isocyanurate mixture from toluene diisocyanate permits ready solubilization in vinyl monomers such as styrene. At about 50% by weight, the solution viscosity is comparable to that of some resins. The isocyanurate/vinyl mixture is found to be stable for at least four months when 1.2% acetyl chloride and 0.03% naphthoquinone are added as stabilizers.

The reactive mixture obtained by dissolving the isocyanurate composition prepared from toluene diisocyanate in styrene, is cured quite readily by polymeric diols in the presence of a tertiary amine catalyst such as triethylene diamine or N-ethylmorpholine or tin catalyst and a peroxide catalyst such as benzoyl peroxide. If the peroxide catalyst is not used, a solid casting is still obtained. In this situation, styrene then acts as a filler and the casting gradually loses weight due to the volatility of styrene. Peroxide catalyst polymerizes the styrene. The casting then does not lose weight when kept at room temperature or heated to 100° C. Good physical properties are obtained after a room temperature cure for 1 week and no post curing at higher temperatures is necessary. These products can be classified as impact resistant styrene polymers and as such they have properties close to ABS polymers, with the added advantage of processibility from the liquid state, requiring less costly processing machines.

In the form of the invention wherein the oligomeric isocyanurate preparation is used to make a polyurethane prepolymer, it will be understood that the oligomeric cyclotrimerized product is reacted with any diol of the kind conventonally employed in making polyurethane propolymers (such as a diol of the kind described above), suitably in the absence of moisture. Subsequently, the resulting prepolymer may be mixed with additional diol and a polyurethane curative (e.g., a diamine or the like), with or without a polyurethane catalyst (e.g. a tertiary amine or a tin catalyst) to form a cured polyurethane elastomer or plastic of the desired shape.

An excess of the organic diisocyanate may also be used as a solvent for the cyclotrimerized oligomeric product. Thus, the isocyanurate mixture obtained from toluene diisocyanate is soluble in monomeric toluene diisocyanate. The solution of oligomer in diisocyanate may be used to prepare a prepolymer (by reaction with a diol as in conventional polyurethane prepolymer practice) and cured elastomers and plastics may then be prepared from these prepolymers in the usual manner. For example, various amounts of the isocyanurate mixture obtained from toluene diisocyanate were dissolved in toluene diisocyanate and these mixtures used to prepare prepolymers. Cured elastomers were prepared in the usual manner. The isocyanurate units did not substantially alter the physical properties of unmodified elastomers, when present at lower concentrations. Changes were more noticeable in percent elongation and tear strength than in other properties, showing that the isocyanurate units impart more rigidity to the polyurethane elastomers and plastics.

The product obtained from TDI (toluene diisocyanate) by the action of the potassium salt of 2-pyrrolidinone appears to be a complex mixture of various isocyanurate materials. The composition depends upon whether TDI is trimerized in bulk or in solution. The best way to analyze the mixture is to separate each component quantitatively. However, for commercial applications of the above mixtures, it is not necessary to know the composition exactly, as long as the amine equivalent is known. Based on this information, one equivalent amount of curative can be employed to react with the composition.

An empirical estimate of the amount of various components present in the above mixture can be made based on certain assumptions and a very simple fractionation experiment. Thus, 100 g of the isocyanurate mixture (amine equivalent 160) is dissolved in 250 ml of ethyl acetate and the solution is poured slowly into excess n-hexane with vigorous stirring. The precipitated material is filtered and freed of solvent by drying in a vacuum oven at 80° C./6 hours. The residue weighs 82 g (amine equivalent 206). The following equation describes the different products. From infra-red spectra it is established that only isocyanurate and isocyanate structures are present and neither carbodiimide or diazetanedione structures can be found.

oligomer. Thus a considerable amount of oligomer is present in such a mixture.

The following examples will serve to illustrate the practice of the invention in more detail.

EXAMPLE 1

One kilogram commercial TDI (a mixture of 80% 2,4-isomer and 20% 2,6-isomer of toluene diisocyanate) is placed in a two liter container which is equipped with a mechanical stirrer and a thermometer. The contents are kept under a nitrogen atmosphere and a catalyst solution prepared from 200 mg potassium hydroxide in

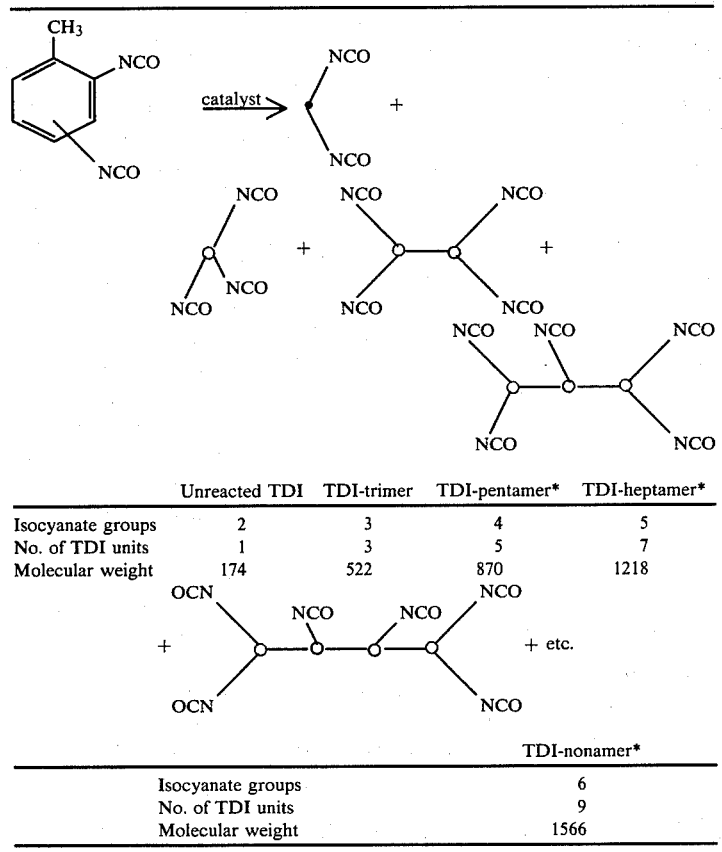

|  | Unreacted TDI | TDI-trimer | TDI-pentamer* | TDI-heptamer* |
|---|---|---|---|---|
| Isocyanate groups | 2 | 3 | 4 | 5 |
| No. of TDI units | 1 | 3 | 5 | 7 |
| Molecular weight | 174 | 522 | 870 | 1218 |

|  | TDI-nonamer* |
|---|---|
| Isocyanate groups | 6 |
| No. of TDI units | 9 |
| Molecular weight | 1566 |

*isocyanurate oligomers
O = isocyanurate ring.

It is difficult to estimate the exact amount and nature of each oligomer present but it is apparent that these oligomers are of low molecular weight since they are soluble in common solvents. The following calculations may be made with respect to a product in which the average number of isocyanate groups in the oligomer is 5 and the average molecular weight is 1218, based on the TDI-heptamer. If 100 g of the original mixture has x moles of unreacted TDI, y moles of TDI-trimer and z moles of TDI-oligomer, then $$\frac{522Y + 1218Z}{3Y + 5Z} = 206 \text{ or } Y = \frac{188}{96} Z$$

Because $522Y + 1218Z = 82$, $$Z(\frac{522 \times 188}{96} + 1218) = 82$$

Therefore $Y = .072$ mole $= 38$ g.
$Z = .037$ mole $= 44$ g.

Thus, in such a product, 100 g of the mixture has 18 g of unreacted TDI, 38 g of TDI-trimer and 44 g TDI- 2 g 2-pyrrolidinone (this catalyst preparation is hereinafter referred to as "K2P") is added with thorough mixing. Ten to fifteen minutes after the addition, an exothermic reaction starts. The temperature of the reaction mixture is kept below 70° C. by cooling with a water bath. The reaction mixture becomes increasingly viscous. As the mixture begins to solidify, the stirrer and the thermometer are removed. The container is sealed under nitrogen and the reaction allowed to continue to completion overnight. The amine equivalent of the product ranges from 150 to 165, showing that most of TDI has undergone trimerization. The product is soluble in tetrahydrofuran, chloroform, ethyl acetate, excess TDI and common vinyl monomers. The infra-red spectrum shows the presence of isocyanurate rings with strong absorptions at 2250 cm$^{-1}$ (—NCO), 1720 cm$^{-1}$ (carbonyl) and 1420 cm$^{-1}$ (isocyanurate).

EXAMPLE 2

In a 500 ml, round bottom, three-necked flask equipped with a magnetic stirrer and a thermometer is placed a mixture of 50 g TDI and 50 ml purified chlorobenzene. The contents of flask are kept under nitrogen and 50 mg of the catalyst solution of potassium salt of 2-pyrrolidinone in 2-pyrrolidinone (K2P catalyst solution prepared as in Example 1) added. The reaction mixture is heated at 60°–70° C. for three hours during which time the solution becomes viscous. The solution is cooled to room temperature and poured into 300 ml diethyl ether with vigorous stirring. The solid material obtained is filtered under suction and washed several times with ether, then dried free of residual ether and chlorobenzene at 80° C./vacuum for 6 hours to a constant weight. Yield 43 g (86%). Amine equivalent, 255. Theoretical amine equivalent for the trimer, 174.

EXAMPLE 3

In a 500 ml, round bottom, three-necked flask, fitted with a magnetic stirrer and a thermometer is placed a mixture of 60 g methylene diphenylisocyanate (MDI) and 100 ml purified chlorobenzene. The mixture is kept under nitrogen and 20 mg of K2P catalyst mixture (prepared as in Example 1) is added. Insoluble material starts to form after the reaction mixture has been heated at 80°–85° for 45 minutes. The mixture is then quickly cooled to room temperature and the contents of the flask poured into 300 ml diethyl ether with vigorous stirring. The solid material obtained is filtered under suction and washed several times with ether, and freed of solvents by drying at 80° C./6 hours in a vacuum oven. Yield 20 g (33%). Amine equivalent, 330. Theoretical amine equivalent for the trimer, 250. The product is soluble in common solvents such as tetrahydrofuran and chloroform. The infra-red spectrum shows the presence of isocyanurate groups.

EXAMPLE 4

One hundred g isophorone diisocyanate is trimerized at 110° C. for 18 hours using 50 mg of the K2P catalyst mixture. A glassy solid is obtained with an amine equivalent of 200. Theoretical amine equivalent for the trimer, 222. The infra-red spectrum shows the presence of the isocyanurate ring structure.

EXAMPLE 5

In a 500 ml, round bottom flask equipped with a magnetic stirrer, a thermometer and a nitrogen inlet tube is placed a mixture of 34.8 g TDI (0.2 mole), 11.9 g phenylisocyanate (0.10 mole) and 50 ml purified chlorobenzene. The mixture is kept under nitrogen and 30 mg of the K2P catalyst mixture added with vigorous stirring. The mixture is heated at 60°–70° C. for three hours. The solution is cooled to room temperature, then poured into 300 ml diethyl ether with vigorous stirring. The solid material obtained is filtered, washed several times with ether and dried until free of solvents at 80° C./6 hours in a vacuum oven. The material is substantially difunctional. Yield 45 g (95%). Amine equivalent, 450.

EXAMPLE 6

In a 500 ml resin kettle, fitted with a stirrer, a thermometer and nitrogen inlet, 20 g (0.022 mole) of isocyanurate material from Example 5 is dissolved in 100 ml purified dimethyl sulfoxide. Two g 1,4-butanediol (0.022 mole) is added and the mixture heated to 90° C. and stirred for three hours. The progress of the reaction is followed by the disappearance of the isocyanate absorption at 2250 cm$^{-1}$ in infra-red spectrum. When all the isocyanate group has reacted, there is no sign of gelation. The polymer thus prepared is precipitated by pouring the solution into 1000 ml water. The solid is filtered under suction, washed several times with water and dried in a vacuum oven at 100° C. to constant weight. Yield 18 g (81%). The fact that the product is a linear polyurethane indicates that the isocyanurate material obtained in Example 5 is substantially a difunctional material.

EXAMPLE 7

This Example shows that the isocyanurate mixture from TDI consists of some unreacted TDI, monomeric isocyanurate and oligomeric isocyanurate. Isocyanurate mixture (100 g), prepared as in Example 1, is dissolved in 250 ml ethyl acetate. The solution is poured into 10 times its volume of n-hexane with vigorous stirring and the precipitated material is filtered and dried. Weight recovered 82 g. Amine equivalent, 206. The theoretical amine equivalent of monomeric isocyanurate is 174. Thus higher molecular weight oligomeric isocyanurates must be present in this mixture which has an amine equivalent of 206. Each of the solution-prepared isocyanurates, precipitated as described in Examples 2, 3, and 5, has an amine equivalent higher than that expected for the monomeric trimer structures. This indicates that soluble oligomeric isocyanurates are obtained by the action of the present catalyst system.

EXAMPLE 8

Various diols indicated in TABLE I are reacted with TDI in the presence of the K2P catalyst system to make one-shot polyurethanes. Thus, in a one liter container 38 g of polypropylene glycol (about 0.09 mole) is mixed with 100 mg of the K2P catalyst. The mixture is warmed to 60° C. and evacuated to remove dissolved air bubbles. After half an hour, 21 g TDI (about 0.12 mole) [NCO:OH, 1.3:1.0] is added, mixed well and further evacuated to remove bubbles. The mixture is then poured onto a flat glass plate mold and kept at room temperature for 15 minutes, followed by post-curing at 100° C./2 hours. A clear casting is obtained. TABLE I summarizes the physical properties of various compositions made in this way using polypropylene glycols (PPG) of molecular weights 425, 710 and 1010, poly(tetramethylene ether glycol) (PTMG) of 1000 molecular weight, N,N'-bis(2-hydroxypropyl)aniline (BHPA), and 1,4-butanediol, in the molar proportions shown. The physical properties are measured by the following ASTM procedures: tensile properties, D-638-63T; tear strength D-624-54; hardness, D-1484-59.

TABLE I

Properties of Isocyanurate Crosslinked Polyurethanes Prepared by 'One-Shot' Method, Using K2P Catalyst

| Composition | Molar ratios of the components | Tensile Strength Psi | % Elongation at break | Tear Strength (Die C) Pli | Hardness Shore A |
|---|---|---|---|---|---|
| PPG-425 + TDI | 1.0:1.3 | 2140 | 200 | 380 | 62 |
| PPG-425 + TDI | 1.0:1.4 | 2600 | 200 | 460 | 72 |
| PPG-710 + TDI | 1.0:1.5 | 430 | 150 | 120 | 48 |
| PPG-710 + TDI | 1.0:1.6 | 720 | 150 | 110 | 61 |
| PPG-710 + TDI | 1.0:2.0 | 1200 | 150 | 150 | 77 |
| PPG-710 + TDI | 1.0:2.0 | 400 | 150 | 90 | 45 |
| PTMG-1000 + BHPA + TDI | 1.0:1.0:3.0 | 2500 | 100 | 280 | 83 |
| PTMG-1000 + BHPA + TDI | 1.0:2.0:4.5 | 4400 | 100 | 770 | 85 |
| PTMG-1000 + 1,4-butanediol + TDI | 1.0:2.0:4.5 | 6800 | 50 | — | — |
| PPG-1010 + BHPA + TDI | 1.0:2.0:4.5 | 4400 | 50 | — | — |

EXAMPLE 9

In a three-liter resin kettle fitted with a stirrer, a thermometer and a nitrogen inlet tube is placed 1,500 g TDI. While stirring under nitrogen, 3.3 g K2P catalyst mixture is rapidly added. An exothermic reaction starts in a few minutes. After 30 minutes, the temperature reaches 65° C. and the reaction mixture is cooled using a water bath. At this stage the reaction mixture is quite viscous and 250 ml styrene is added to reduce viscosity. A total of 1500 ml (1350 g) styrene is added in 250 ml portions at suitable intervals so that a workable viscosity is always maintained. In three hours, the temperature has fallen to 38° C. To stabilize the mixture, 750 mg naphthoquinone and 5.8 g acetyl chloride are added and mixed thoroughly. Amine equivalent is 306.

EXAMPLE 10

Using the same method as described in Example 9, various mixtures are prepared by replacing styrene with equivalent amounts of other vinyl monomers such as acrylonitrile, methyl acrylate, ethyl acrylate and n-butyl acrylate.

EXAMPLE 11

The above mixtures from Examples 9 and 10 are compatible with polyethylene glycols and polypropylene glycols of various molecular weights. They are also compatible with poly(butadiene-co-acrylonitrile)diol, cyclohexanedimethanol, etc. The curing of these compositions is accomplished as shown below.

The composition (67 g) from Example 9 is mixed with 40 g polyethylene glycol 400 [NCO:OH, 1.1:1.0]. A clear solution is obtained. Benzoyl peroxide paste (50%, 1 g) is added and mixed thoroughly. The mixture is quite stable. However, when 0.25 ml N-ethylmorpholine is added and mixed, an exothermic reaction starts. The resin mixture is poured onto a glass mold and allowed to set. Gel time is 15 to 20 minutes. The casting is removed from the mold after 3 hours. The physical properties are determined after allowing the casting to cure at room temperature for 7 days.

TABLE II summarizes the physical properties of the casting obtained from the compositions indicated. Flexural properties are obtained according to ASTM D-790-66; heat deflection by ASTM D-648-56 and Izod notched impact strength by ASTM D-256-70.

TABLE II

Properties of the Casings Obtained from the Compositions Derived from Isocyanurate Mixture Obtained from TDI and Vinyl Monomer

| Composition* | Tensile Strength Psi | Elongation % | Flexural Modulus $\times 10^5$ psi | Hardness Shore D | Heat Deflection Temp. °C. (264 psi) | Impact Resistance notched Izod ft-lb/in |
|---|---|---|---|---|---|---|
| Isocyanurate + styrene + polyethylene glycol 200 | 4070 | 2.5 | 2.1 | 73 | 60 | 2.5 |
| 400 | 7040 | 4.5 | 2.2 | 76 | 46 | 4.2 |
| 600 | 3140 | 75.0 | 0.3 | 63 | — | 18.5 |
| Isocyanurate + methyl acrylate + polyethylene glycol 200 | 8450 | 5.0 | 2.7 | 87 | 75 | 1.8 |
| 400 | 4190 | 18.0 | 1.0 | 77 | 42 | 4.0 |
| 600 | 1700 | 123.0 | — | 47 | — | 30.0 |
| Isocyanurate + ethyl acrylate + polyethylene glycol 200 | 4430 | 5.6 | 1.6 | 78 | 70 | 1.6 |
| 400 | 2880 | 9.2 | 0.6 | 65 | 40 | 9.0 |

TABLE II-continued

Properties of the Casings Obtained from the Compositions Derived from Isocyanurate Mixture Obtained from TDI and Vinyl Monomer

| Composition* | Tensile Strength Psi | Elongation % | Flexural Modulus X10⁵ psi | Hardness Shore D | Heat Deflection Temp. °C. (264 psi) | Impact Resistance notched Izod ft-lb/in |
|---|---|---|---|---|---|---|
| 600 | 820 | 114.0 | — | 34 | — | 15.0 |
| Isocyanurate + n-butyl acrylate + polyethylene glycol | | | | | | |
| 200 | 5890 | 6.3 | 1.9 | 74 | 80 | 2.2 |
| 400 | 3700 | 12.6 | 1.2 | 66 | 45 | 4.5 |
| 600 | 1270 | 118.0 | — | 34 | — | 16.0 |
| Isocyanurate + styrene + 1:1 mix of cyclohexanedimethanol + polyethylene glycol | | | | | | |
| 600 | 7100 | 6.0 | 2.4 | 79 | — | — |

*Isocyanurate 52%, vinyl monomer 48% by weight; NCO:OH, 1.1:1.0; catalyst: 0.25% N-ethylmorpholine; 1% benzoyl peroxide; samples cured at room temperature, one week.

EXAMPLE 12

In this Example, instead of a single monomer, mixtures of monomers are used (styrene:ethyl acrylate in 1:1 ratio by volume, and styrene:n-butyl methacrylate in 1:1 ratio by volume) to prepare isocyanurate resins following the procedure of Example 9 (isocyanurate 52%, vinyl monomers 48%, by weight). The resins are employed to make castings according to the procedure of Example 11, using polyethylene glycol (PEG) of molecular weight 400 or 600, at an NCO:OH ratio of 1.1:1.0, in the presence of 1% by weight of benzoyl peroxide paste and 0.25% by volume of N-ethylmorpholine catalyst. After cure at room temperature for seven days the physical properties are as shown in TABLE III.

TABLE III

Properties of Castings Prepared from Isocyanurate Resins Containing Mixtures of Vinyl Monomers

| Composition | Tensile Properties | | | Hardness Shore A |
|---|---|---|---|---|
| | Tensile Strength (Psi) | Elongation (%) | Tear Properties Die C (Pli) | |
| Isocyanurate + [ethylacrylate:styrene] | | | | |
| PEG 400 | 2000 | 130 | 360 | 80 |
| PEG 600 | 1000 | 200 | 90 | 60 |
| Isocyanurate + [n-butyl methacrylate:styrene] | | | | |
| PEG 400 | 2020 | 100 | 440 | 80 |
| PEG 600 | 2280 | 260 | 130 | 70 |

TABLES II and III show that the final products have a higher elongation when they are prepared from a mixture of styrene and an acrylate monomer, rather than from a single monomer. Other physical properties show less significant variations. In these systems, the vinyl monomers undergo polymerization during cure of the resins. The above results indicate that the contributions of homopolymers and of copolymers to properties such as elongation are different.

EXAMPLE 13

In this example, styrenated isocyanurate resin prepared as in Example 9 is blended with two diols, namely, polyethylene glycol (PEG) of 600 molecular weight and 1,4-butanediol, in the ratios indicated in TABLE IV, and castings are made using benzoyl peroxide and N-ethylmorpholine as in Example 11. Physical properties after cure at room temperature for seven days are shown in TABLE IV.

TABLE IV

Properties of Products from Styrenated Isocyanurate Resins Cured with a Mixture of Diols

| Composition | Tensile Properties | | Tear Strength Die C(Pli) | Flexural Modulus (K Psi) |
|---|---|---|---|---|
| | Tensile Strength (Psi) | Elongation (%) | | |
| Resin: PEG 600: 1,4-Butanediol (ratio in equivalents) | | | | |
| 4:3:1 | 4100 | 150 | 650 | 30 |
| 3:2:1 | 3800 | 100 | 830 | 50 |
| 2:1:1 | 4100 | 125 | 840 | 60 |
| 3:1:2 | 5200 | 30 | 570 | 160 |
| 4:1:3 | 5000 | 5 | 230 | 180 |
| Resin: PEG 600: 1,4 - Butanediol (ratio in equivalents) | | | | |
| 4:3:1 | 3900 | 175 | 600 | 30 |
| 3:2:1 | 4000 | 100 | 970 | 50 |
| 2:1:1 | 6100 | 75 | 990 | — |
| 3:1:2 | 4700 | 10 | 390 | 190 |

Thus, products with medium to high flexural moduli with good elongation characteristics can be prepared readily by choice of a suitable mixture of diols instead of a single diol.

EXAMPLE 14

Urethane prepolymer resin based on a polyether diol is prepared as follows:

Poly(tetramethylene ether glycol) of 1000 molecular weight (750 g) is maintained under a nitrogen atmosphere in a 1-liter resin kettle equipped with a mechanical stirrer, thermometer and nitrogen inlet, heated to 95° C., then placed under vacuum for 1 hour to remove traces of moisture. The diol is then cooled to 40° C., TDI (268 g), (NCO:OH, 2.05:1.0) is quickly added and the mixture maintained at 80° C. for 1 hour after the initial exotherm is over. The prepolymer thus obtained is degassed under vacuum for 15 minutes with stirring and 15 minutes without stirring and stored in a metal can after being sealed under nitrogen. Amine equivalent, 645.

Different weight percentages of isocyanurate products from TDI (indicated as "ICU A" in Table V) or isocyanurate products from a mixture of 2 moles TDI and 1 mole phenyl isocyanate (indicated as "ICU B" in Table V) are dissolved in TDI and the appropriate isocyanate values determined. Prepolymers are prepared following the procedure in the previous paragraph using these isocyanate mixtures and keeping NCO:OH at 2.05:1.0.

EXAMPLE 15

The urethane prepolymer resin prepared as in Example 14 (100 g) is heated in a vacuum oven at 80° C. and evacuated for 1 hour until all the dissolved gases are removed. Methylene bis(o-chloroaniline) (18.5 g) (NCO:NH$_2$ 1.1:1.0) is melted and mixed with the degassed prepolymer. The mixture is further degassed and then poured onto a flat mold and cured at 100° C./16 hours to form an elastomer. The isocyanurate-containing prepolymers of Example 14 are similarly cured with methylene bis(o-chloroaniline) to form elastomers keeping NCO:NH$_2$ at 1.1:1.0. TABLE V summarizes physical properties of these castings.

TABLE V

Polyurethane Elastomer Properties

| Composition/ wt % Isocyanurate | Hardness Shore D | Tear Strength Die C, Pli | Tensile Properties (at ambient temperature) | | Tensile Properties (at elevated temperature) | | |
|---|---|---|---|---|---|---|---|
| | | | Tensile (Psi) | Elongation % | 100% Modulus (Psi) | | |
| | | | | | 50° C. | 100° C. | 150° C. |
| — 0% | 58 | 789 | 4700 | 500 | 1500 | 1200 | 920 |
| ICU A 9% | 57 | 670 | 5500 | 500 | 1430 | 1230 | 830 |
| ICU A 18% | 59 | 651 | 5600 | 500 | 1400 | 1150 | 810 |
| ICU A 25% | 56 | 616 | 3900 | 300 | 1690 | 1110 | * |
| ICU B 10% | — | — | 4100 | 300 | 1730 | 1350 | 926 |
| ICU B 19% | — | — | 3200 | 200 | 1870 | * | * |

*Fractured before 100% elongation.
ICU A is isocyanurate product from TDI.
ICU B is isocyanurate product from 2 moles TDI and 1 mole phenyl isocyanate

EXAMPLE 16

In a 500 ml, round bottom, three-necked flask, fitted with a magnetic stirrer, reflux condenser, thermometer and nitrogen inlet tube, 52 g solid isocyanurate mixture prepared from toluene diisocyanate using K2P catalyst is dissolved in 100 ml ethyl acetate with stirring under nitrogen. The mixture is warmed to 60° C., then a mixture of poly(tetramethylene ether glycol) 1000 molecular weight (63 g) and di-n-butylamine (16 g) dissolved in ethyl acetate (50 ml) is added to the above solution during 5 to 10 minutes. The mixture is heated at 60°–70° C. for 30 minutes and the contents of the flask coated onto a flat glass plate. The solvent is allowed to evaporate and the coating cured by moisture in the atmosphere. After two days, most of the solvent has evaporated and the coating is post-cured at 100° C./2 hours.

TABLE VI lists some of the physical properties of such coatings.

TABLE VI

Physical Properties of Moisture-cured, Solvent-cast Isocyanurate Polymer Coatings

| Composition | Solvent | Ratio NCO Active hydrogen | Tensile Strength Psi | Elongation % | Tear Strength Die C, Pli |
|---|---|---|---|---|---|
| Isocyanurate + PTMG 1000 + di-n-butylamine | Ethyl acetate | 1.7:1.0 | 1600 | 300 | 260 |
| Isocyanurate + PTMG 1000 + di-n-butylamine | Chloroform | 1.7:1.0 | 2400 | 250 | 330 |
| Isocyanurate + PTMG 1000 + n-butanol | Chloroform | 1.6:1.0 | 2300 | 200 | 360 |

What is claimed is:

1. A method of cyclotrimerizing an organic diisocyanate comprising contacting the organic diisocyanate with a small but effective amount of potassium salt of 2-pyrrolidinone as a cyclotrimerization catalyst, whereby the organic diisocyanate is cyclotrimerized to an isocyanurate-containing product soluble in organic solvents.

2. A method as in claim 1 in which the organic diisocyanate is selected from the group consisting of toluene diisocyanate, methylene diphenylisocyanate and isophorone diisocyanate.

3. A method as in claim 1 carried out in an inert organic solvent medium.

4. A method as in claim 1 carried out in an excess of the diisocyanate as the medium.

5. A method as in claim 1 in which the product contains a mixture of monomeric and oligomeric isocyanurates.

6. A method as in claim 1 in which the reaction mixture is agitated under an inert atmosphere at a temperature between 20° C. and 150° C., for a period of from ½ to 24 hours.

7. A method as in claim 1 in which the cyclotrimerization reaction is quenched by the addition of an acylating agent.

8. The product obtained by the method of claim 1.

9. A solution of the product of claim 1 in an excess of the starting diisocyanate.

10. A method of making an isocyanurate-crosslinked polyurethane comprising mixing a diol, an organic diisocyanate and a catalytic amount of potassium salt of 2-pyrrolidinone.

11. The product of the method of claim 10.

12. A non-cellular product as in claim 11.

13. A solution of the product of claim 1 in a liquid vinyl monomer.

14. A method of making a thermoset polymer comprising mixing
(a) a solution of the product of claim 1 in a vinyl monomer,
(b) a diol,
(c) a peroxide curative, and
(d) a catalyst for the reaction between —NCO and —OH to form polyurethane, and thereafter subjecting the mixture to curing conditions.

15. The product of the method of claim 14.

16. A non-cellular product as in claim 15.

17. A method of making a urethane prepolymer comprising mixing a polymeric diol with the product of claim 1 in the absence of moisture.

18. A prepolymer produced by the method of claim 17.

19. A method of making a cured polyurethane elastomer comprising providing a prepolymer as in claim 18, mixing the prepolymer with a polyurethane curative, and subjecting the mixture to curing conditions.

20. The product of the method of claim 19.

21. A non-cellular product as in claim 20.

22. A coating composition comprising the product of claim 1, a diol, and a polyurethane catalyst, dissolved in an inert organic solvent.

23. A method of coating a substrate comprising providing the coating composition of claim 22, applying said composition to the substrate, volatilizing the solvent, and curing the thus-deposited coating by the action of atmospheric moisture.

24. The coated substrate resulting from the method of claim 23.

* * * * *